(12) United States Patent
Baxter, Jr.

(10) Patent No.: US 7,031,439 B2
(45) Date of Patent: Apr. 18, 2006

(54) AUDIO FILE TRANSMISSION METHOD

(76) Inventor: John Francis Baxter, Jr., 1083 N. Collier #248, Marco Island, FL (US) 34145

( * ) Notice: Subject to any disclaimer, the term of this patent is extended or adjusted under 35 U.S.C. 154(b) by 193 days.

(21) Appl. No.: 10/604,618

(22) Filed: Aug. 5, 2003

(65) Prior Publication Data

US 2004/0109542 A1   Jun. 10, 2004

Related U.S. Application Data

(60) Division of application No. 09/682,431, filed on Aug. 31, 2001, now Pat. No. 6,765,996, which is a continuation-in-part of application No. 09/517,415, filed on Mar. 2, 2000, now Pat. No. 6,385,306.

(51) Int. Cl.
*H04M 1/64* (2006.01)

(52) U.S. Cl. .............. 379/88.14; 379/88.17; 379/88.13; 379/88.21; 709/206

(58) Field of Classification Search ......... 379/88.14, 379/88.16–88.25, 93.01, 93.12, 93.24, 93.26–93.28, 379/114.4, 114.1, 114.13, 142.04, 142.05, 379/142.06, 335.01–335.1, 88.01–88.04; 370/351–356; 709/201, 203, 206; 704/270, 704/270.1, 275
See application file for complete search history.

(56) References Cited

U.S. PATENT DOCUMENTS

| | | | |
|---|---|---|---|
| 5,557,659 A * | 9/1996 | Hyde-Thomson | 379/88.13 |
| 6,075,844 A * | 6/2000 | Goldberg et al. | 379/88.17 |
| 6,246,983 B1 * | 6/2001 | Zou et al. | 704/260 |
| 6,385,306 B1 * | 5/2002 | Baxter, Jr. | 379/88.13 |
| 6,507,643 B1 * | 1/2003 | Groner | 379/88.14 |
| 6,519,479 B1 * | 2/2003 | Garudadri et al. | 455/563 |
| 6,654,448 B1 * | 11/2003 | Agraharam et al. | 379/88.14 |
| 6,707,891 B1 * | 3/2004 | Guedalia | 379/88.17 |
| 6,765,996 B1 * | 7/2004 | Baxter, Jr. | 379/88.14 |
| 6,784,899 B1 * | 8/2004 | Barrus et al. | 345/717 |
| 2001/0041590 A1 * | 11/2001 | Silberfenig et al. | 455/556 |
| 2001/0055371 A1 * | 12/2001 | Baxter, Jr. | 379/88.11 |
| 2002/0055844 A1 * | 5/2002 | L'Esperance et al. | 704/260 |
| 2002/0067805 A1 * | 6/2002 | Andrews | 379/67.1 |
| 2004/0062365 A1 * | 4/2004 | Agraharam et al. | 379/88.14 |
| 2004/0109542 A1 * | 6/2004 | Baxter, Jr. | 379/88.13 |
| 2004/0132432 A1 * | 7/2004 | Moores et al. | 455/413 |

* cited by examiner

*Primary Examiner*—Roland G. Foster
(74) *Attorney, Agent, or Firm*—Smith & Hopen, P.A.; Anton J. Hopen

(57) ABSTRACT

A computer implemented method of transmitting electronic voice messages including the steps of establishing a caller identity associated with a first telephone connection, recording a first audio clip from the first telephone connection, establishing an email target string, encapsulating the first audio clip, the caller identity and the email target string into a first email attachment, transmitting the first email attachment to a first email account associated with the email target string, broadcasting the first audio clip to a second telephone connection, prompting the second telephone connection for a reply recording, responsive to a record signal, recording a second audio clip from the second telephone connection, encapsulating the second audio clip and the caller identity into a second email attachment, and transmitting the second email attachment to a second email account associated with the caller identity.

6 Claims, 5 Drawing Sheets

AUDIO FILE TRANSMISSION METHOD

RELATED APPLICATIONS

This disclosure is a divisional application claiming the benefit of the filing date of pending U.S. patent application entitled: "Audio File Transmission Method," by the same inventor, filed on Aug. 31, 2001 now U.S. Pat. No. 6,765, 996, bearing Ser. No. 09/682,431, which is a Continuation-in-Part to U.S. patent application Ser. No. 09/517,415 that was filed Mar. 2, 2000 and issued as U.S. Pat. No. 6,385,306 on May 7, 2002.

BACKGROUND OF INVENTION

1. Field of Invention

The present invention relates generally to a method of transmitting audio messages over a network, and more particularly, a method of emulating voice messaging using electronic mail technology.

2. Background of the Invention

Electronic mail ("email") has proliferated as a common method of communication. Initial communications consisted of ASCII (American Standard Code for Information Interchange) text. In an ASCII file, each alphabetic, numeric, or special character is represented with a 7-bit binary number (a string of seven 0s or 1s). 128 possible characters are defined. However, basic ASCII text email messages have progressed to include graphics, audio and even video. Graphic images, digital audio files and digital video all require an encoding and decoding process when transmitted over the Internet. A user wishing to encode a voice message and send the message to a preselected email address had to accomplish several steps and have certain hardware and software equipment. The user would typically record their voice message on a computer using a sound card attached or integrated into the motherboard of a computer.

The voice message is a sequence of analog signals that are converted to digital signals by the audio card, using a microchip called an analog-to-digital converter (ADC). When sound is played, the digital signals are sent to the speakers where they are converted back to analog signals that generate varied sound. Audio files are usually compressed for storage or faster transmission. Audio files can be sent in short stand-alone segments—for example, as files in the WAV format. In order for users to receive sound in real-time for a multimedia effect, listening to music, or in order to take part in an audio or video conference, sound must be delivered as streaming sound. More advanced audio cards support wavetables, or precaptured tables of sound. The most popular audio file format today is MP3 (MPEG-1 Audio Layer-3).

Once these digital audio files reside on the hard drive of the user, the user would attach the file to an email sent to a selected recipient. When the file is attached, it might be transmitted in a standardized protocol such as Multi-Purpose Internet Mail Extensions (herein "MIME"). MIME is an extension of the original Internet e-mail protocol that lets people use the protocol to exchange different kinds of data files on the Internet: audio, video, images, application programs, and other kinds, as well as the ASCII handled in the original protocol, the Simple Mail Transport Protocol (SMTP). In 1991, Nathan Borenstein of Bellcore proposed to the Internet Engineering Task Force that SMTP be extended so that Internet (but mainly Web) clients and servers could recognize and handle other kinds of data than ASCII text. As a result, new file types were added to "mail" as a supported Internet Protocol file type.

Attempts have been made to develop unified messaging systems that link video, text, audio, document management and the like into a single system. However, such attempts have not provided a means to enable voice messaging to maintain continuity throughout a thread, store outbound voice communications, and provide a reply function equivalent to the simplicity of email replies. Furthermore, many unified messaging application require expensive proprietary equipment wherein typical SMTP email servers are inexpensive, well-developed and already employed by most medium or larger business entities.

Consequently, there is a need in the art for a method of transmitting an audio voice message to an email address without the need of a computer.

There is a further need in the art for a method of replying to an audio voice message without the need to key in a telephone number.

There is a further need in the art for a method maintaining a thread of voice mail correspondence.

There is a further need in the art for a means to store and validate the transmission and content of an outgoing voice message.

There is a further need in the art for a novel dual email and telephone extension identity for user to access voice messages from a telephone or computer using a common set of alphanumeric characters.

There is a further need in the art for a new means of delivering audio advertisements to a captive audience.

There is a further need in the art for a new means of obtaining survey and demographic data.

There is a further need in the art for a method to provide untethered access to voice and email messaging using voice command zones.

There is a further need in the art for a means of scheduling the delivery of voice messages to enhance the impact on the recipient.

However, in view of the prior art in at the time the present invention was made, it was not obvious to those of ordinary skill in the pertinent art how the identified needs could be fulfilled.

SUMMARY OF INVENTION

The above and other objects of the invention are achieved in the embodiments described herein by providing a computer implemented method of transmitting electronic voice messages comprising the steps of establishing a caller identity associated with a first telephone connection. This may be achieved by parsing the Telco caller ID string and associating that string with a preexisting user record. In other words, a call from 727-507-8558 might be associated with the identity of a law firm and linked to additional records such as address, fax, user name, email address and the like. For most applications, it is preferred that the caller ID string be linked to the email address of the caller in order that the recipient may easily reply to the original message.

In the next step, a first audio clip is recorded from the first telephone connection. The audio clip may be digitized in any number of computer readable formats including, but not limited to, WAV, AIFF, MP3 and the like. An email target string is then established. This might be resolved by a number of alternative methods. First, a "speed dial" interface may be established. The interface might be resident in an operating system, network appliance or on a website. Users pre-configure their settings similar to speed dials used in standard telephone systems wherein numerals are associated with the email target string. This has the advantage that alphanumeric characters are easily entered on a computer keyboard, but often problematic on a telephone system. A typical telephone has twelve keys which may be depressed in various iterations to resolve an alphabetic character. Alternatively, the individual alphanumeric characters may be individually spoken and resolved with voice recognition means as disclosed in U.S. patent application Ser. No. 09/517,415 filed Mar. 2, 2000 which is incorporated by reference.

The first audio clip, the caller identity and the email target string are all encapsulated into a first email attachment. The first email attachment is then transmitted to a first email account which is associated with the email target string. This is typically an SMTP address accessed directly from an information store such as Microsoft Exchange, Novell Groupwise or the like. Alternatively, it may be stored offsite and accessed through a POP3 means. A second telephone connection accesses the first email attachment wherein the first audio clip is broadcast to the second telephone connection. Once broadcast, the caller is then prompted for a reply recording. Responsive to a record signal, a second audio clip from the second telephone connection is then recorded. The second audio clip, the caller identity and the email target string are all encapsulated into a second email attached which is then transmitted to a second email account associated with the caller identity.

In order to establish a thread of messages having a common topic, the first audio clip is appended to the second audio clip. The second audio clip might be placed after the first audio clip in order to preserve the chronological order the thread, or the second audio clip might be placed before the first audio clip in order to avoid the need to hear previously transmitted audio data. It should be understood that the reply loops may continue on far beyond one initiating email and a single reply. It is also anticipated that carbon copies, blind carbon copies and forwarded be enabled as they are standard SMTP functions.

It is preferred that the recording time is encapsulated into the email attachments with a date/time stamp. This may be achieved by encoding the alphanumeric characters of the date and time into the text body of the email message. Alternatively, the date and time may be synthesized as speech and appended to the audio clip.

Providing system security includes the steps of establishing the caller identity associated with the first telephone connection by receiving a password entry from the first telephone connection and associating the password entry against a preexisting caller account. Receiving the password entry may include interpreting at least one DTMF signal responsive to the keying of buttons on a touch-tone telephone. Alternatively, the process may include the step of receiving the password entry by interpreting at least one alphanumeric character as spoken into the telephone. In another embodiment, the invention utilizes biometrics by receiving a predetermined call phrase, reducing the call phrase to a voice pattern, and associating the voice pattern against a preexisting caller account by speech identification means such as described by U.S. Pat. No. 5,608,784 of which specification is incorporated by reference.

The email target string may be established by the steps of interpreting a plurality of DTMF signals responsive to the keying of buttons on a touch-tone telephone. Alternatively, the step may include receiving a plurality of individually spoken alphanumeric characters representative of the email target string and translating the spoken characters to their binary equivalent by a speech identification means.

With sensitive communications, it is preferred that the email attachment be encrypted. As an added security measure, an addition step may be employed by establishing a hash of the first email attachment and storing the hash in a secure storage means.

Other embodiment of the invention includes the steps of establishing a first SMTP email address, the first SMTP email address having a distinct prefix address and a domain address. For example, in a common email address format such as "2224848@uspto.gov" the prefix address would be "2224848" and the domain address would be "@uspto.gov." In the next step a primary telephone number is established. This number is preferably a toll-free number that is easily remembered with an alphabetic phrase correlated to the numerals of the number. For illustrative purposes, an example number might be "1-800-555-EMAIL." In the next step, an extension to the primary telephone number is established. The extension contains alphanumeric characters identical to the distinct prefix address. For example, the above-mentioned email address would have an extension of 2224848. The full dialing string to the account would be "1-800-555-EMAIL, ext. 2224848." A text-to-speech synthesizer established which is responsive to a call to the primary telephone number and extension wherein email messages sent to the first SMTP address are synthesized into computer-generated speech. A voice digitizing means is then established wherein reply messages spoken to the primary telephone number and extension are converted into an audio computer file and transmitted to a second SMTP address as an email attachment.

Callers that wish to retrieve their email from a regular telephone may be identified by businesses as a potential target for marketing new products and services. Furthermore, the caller is somewhat of a captive audience as the caller is seeking information of personal interest. An alternative embodiment of the invention includes the step of broadcasting a commercial to callers of the first SMTP email address. For example, the caller might hear "before we retrieve your messages, please listen to a brief message from our sponsor . . . " The caller might be presented with an option to pay for a subscription if they find the sponsor messages annoying or may enjoy the service free by their exposure to the advertisements. Another step may include surveying callers to the primary telephone number regarding caller demographics. The demographic may include age, gender, occupation, residence and the like. Using this information, demographically targeted commercials may be broadcast to callers according to survey results. To encourage callers to engage in the survey questions, an additional step of offering prize incentives for engaging in survey activities may be included. The prize incentives may be long distance telephone credits and, preferably, the assignment of those credits to a preexisting long distance calling card.

One objective of the current invention is to simplify the task of voice messaging and removing the tether of electronic equipment from the user. Accordingly, an alternative embodiment of the invention includes the steps of establishing a voice command zone. The voice command zone is a pre-designated area from which spoken commands and voice recordings are obtained. The zone may be established in an automobile passenger compartment, a human-inhabitable dwelling, or the like. An array of voice command instructions relating to the operation of an electronic message system are established. A microphone input means receives the voice command instructions. Responsive to a record command, an audio message received by the microphone input means is encapsulated into an email attachment and transmitted to a predetermined SMTP address. A play command broadcasts audio files attached to emails through a speaker means. Alternatively, a text-to-voice synthesizer synthesizes text messages into speech which is then broadcast through the speaker means responsive to the play command. For zones that have low ambient noise, an omni directional microphone is appropriate. However, where voice commands from a specific individual are desired, an alternative embodiment of the invention includes a target location sensor means. This may include an RF or IR transmitter placed on the individual. A target acquisition means picks up the RF or IR broadcast and points a unidirectional microphone input means towards the individual thereby avoiding extraneous audio noise.

In yet another embodiment of the invention, a caller identity is established with a telephone connection and an audio clip is recorded from the first telephone connection. An email target string is established. The audio clip, caller identity and email target string are encapsulated into an email attachment. The email attachment is then transmitted to an email account associated with the email target string and the email attachment is also stored in a sent items repository. This embodiment of the invention serves a critical function, particularly in the business and legal communities of providing a record of outbound communication. In the prior art, one business person may leave a message on a voice mail system, but has no means to prove that message was left, much less the actual content of that message. The ability to produce a record of outbound communication from one business to another serves the function to validate important communications and messages were actually transmitted. It is preferred that along with the email attachment, the email target string and a date-time stamp string are stored in association with the email attachment.

In an alternative embodiment of the invention, a caller may wish to have a communication delivered at a predetermined time. Email communications are substantially instantaneous. Therefore, it might be known that an intended recipient may not be current available due to work schedule, time zone differences or the like. If the communication is immediately transmitted, the recipient may find it buried below more recent communications. Furthermore, many message system provide immediate feedback with sound or an interface display when a new message is received. Accordingly, it would be advantageous to provide the ability to schedule the delivery of the communication. In this embodiment of the invention, a caller identity is associated with a telephone connection. An audio clip is recorded from the telephone connection. An email target string is established. The audio clip, caller identity and email target string are encapsulated into an email attachment. A broadcast time is established. The email attachment is then held in a queue until the broadcast time is reached wherein the email attachment is transmitted to an email account associated with the email target string. The email target string may be associated with a time zone associated with the physical location of the intended recipient. The broadcast time then may be automatically calculated relative to the time zone.

Accordingly, it is an object of the present invention to provide a method of transmitting an audio voice message to an email address without the need of a computer.

It is another object of the present invention to provide a method of replying to an audio voice message without the need to key in a telephone number.

It is another object of the present invention to provide a method maintaining a thread of voice mail correspondence.

It is another object of the present invention to provide a means to store and validate the transmission and content of an outgoing voice message.

It is another object of the present invention to provide a novel dual email and telephone extension identity for user to access voice messages from a telephone or computer using a common set of alphanumeric characters.

It is another object of the present invention to provide a new means of delivering audio advertisements to a captive audience.

It is another object of the present invention to provide a new means of obtaining survey and demographic data.

It is another object of the present invention to provide untethered access to voice and email messaging using voice command zones.

It is another object of the present invention to provide a means of scheduling the delivery of voice messages to enhance the impact on the recipient.

An advantage of the invention is that it incorporates well-developed SMTP technology to deliver voice messages globally without incurring long distance charges.

Another advantage of the invention is that those wishing to send an audio voice message do not need to have any computer equipment.

Another advantage of the invention is that recipients of voice messages no longer are required to find and dial the number of the originator, the recipient can easily reply to the voice message with a single click, button or spoken command.

Another advantage of the invention is that the context of a voice message discussion may be maintained as a thread. Past comments may be accessed and referenced as needed.

Another advantage of the invention is that outgoing voice messages may be easily saved in virtually any computer readable medium. Proprietary voice message systems are not required.

Another advantage of the invention is that businesses may subrogate the costs of the messaging system infrastructure with demographically targeted advertising. Users unable to subscribe to the service can still have access paid for by advertising businesses.

Another advantage of the invention is that delivery of voice messages may be coordinated to coincide with the schedule of the recipient so that the voice message is delivered at the optimum time.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
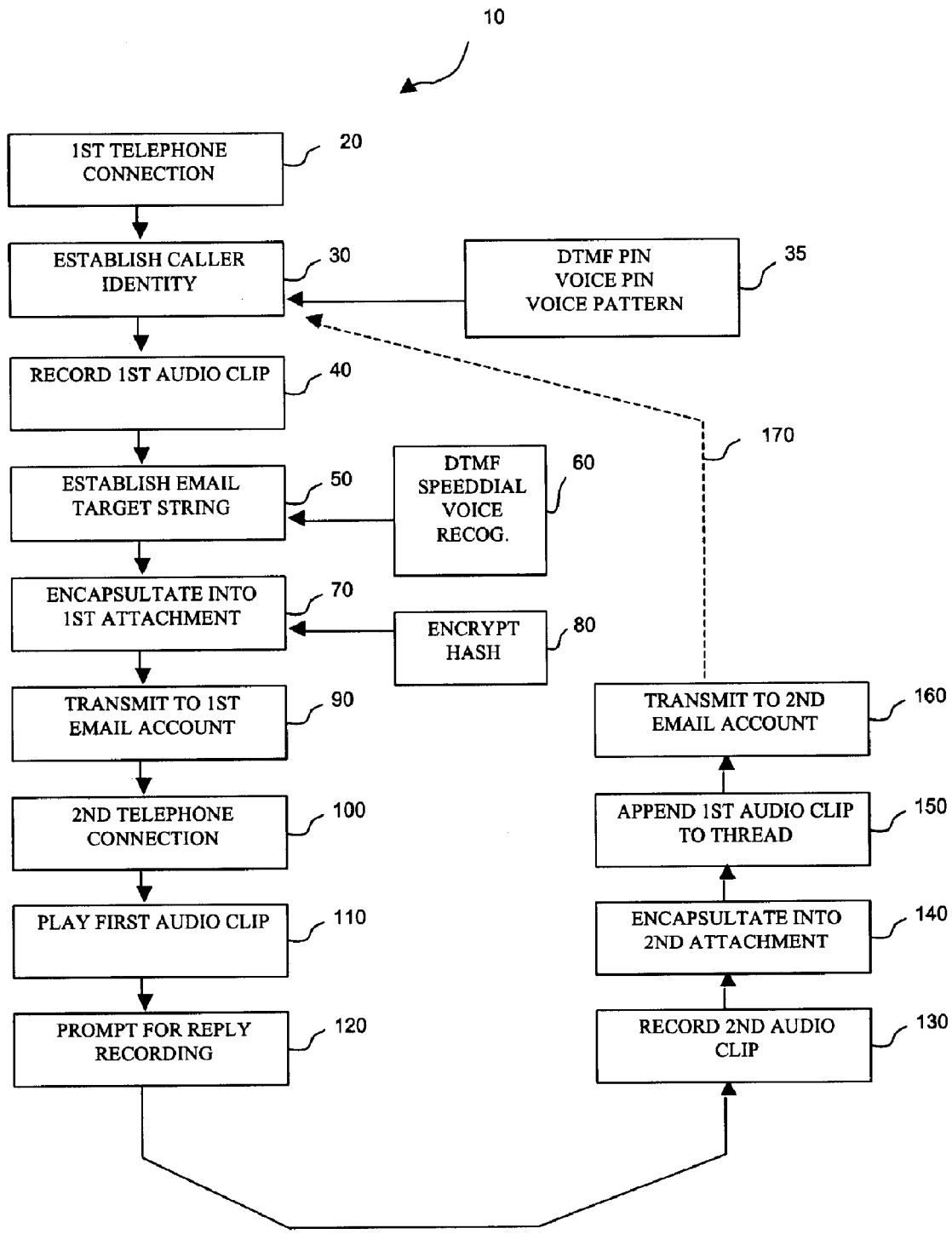
FIG. 1 is a schematic view of the invention as generally disclosed.

Referring initially to FIG. 1, it will there be seen that an illustrative embodiment of the prior is denoted by the reference number 10 as a whole. A first telephone connection 20 is made. The caller identity is establish 30 and a first audio clip is recorded 40. The caller identity may be established by a plurality of means 35 which include, but are not limited to, DTMF entries, voice recognition of entries, or identification of a preexisting voice pattern all associated with a preexisting user account. An email target string is established 50. The email target string may be established by DTMF entries, speed dial function or voice recognition 60. The caller identity, audio clip and email target string are encapsulated into a first email attachment 70. Preferably, the attachment is encrypted 80 and a hash is generated. The attachment is transmitted to a first email account 90. Responsive to a second telephone connection 100, the first email account is accessed and the audio clip is played 110 over the second telephone connection. The caller is prompted for a reply recording 120 and a second audio clip is recorded 130. The second audio clip is encapsulated into a second email attachment 140 and optionally the first audio clip is appended 150 to establish a thread of related messages. The second email attachment is then transmitted to a second email account 160 associated 170 with the original caller identity 30.

Figure 2:
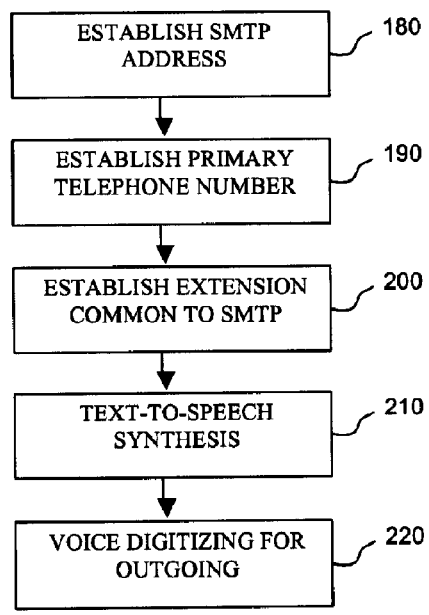
FIG. 2 is a schematic view of an embodiment of the invention using a common SMTP and telephone extension string.

FIG. 2 shows an embodiment of the invention that provides a common identity for both telephone and email communications while allowing access from either medium. An SMTP address is established 180 which contains an alphanumeric character string common to a telephone extension 200 established off a primary telephone number 190. Preferably, the alphanumeric characters are all integers, and thus easily entered on a touch-tone telephone. A text-to-speech synthesis means 210 reads text messages over the telephone and responses are digitized 220 for outgoing messaging over the telephone connection. Users are able to access the email account through standard POP3 mail connections as well.

Figure 3:
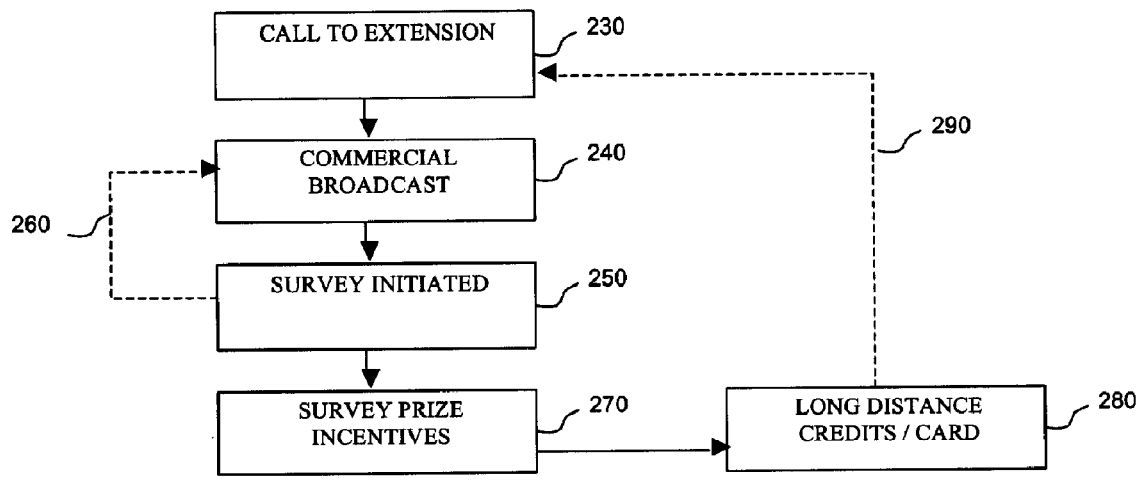
FIG. 3 is a schematic view of an embodiment of the invention incorporating demographically targeted advertising responsive to survey data.

FIG. 3 illustrates an embodiment of the invention wherein a call is made to the extension 230 and a commercial is broadcast 240 to the caller. This provides a means of paying for the infrastructure of the telecommunications system without necessarily requiring a subscription to the service. Surveys may be initiated 250 which can then demographically target 260 the most appropriate commercial broadcast 240 according to the characteristics of the individual caller. Survey prize incentives 270 may be offered to encourage active participation in the surveys. A means of distributing the dual SMTP and extension information may be through the use of calling cards. These calling cards are traditionally used for long distance service credits that are expended as the user makes calls. Login passwords for the SMTP address and/or PINs for accessing the system via telephone may be secured as scratch-off areas on the physical card itself. Alternatively, the cards may be wrapped or covered with an opaque material that indicates if the material has been tampered with. Such privacy sealing means are well known and often employed for lottery tickets and sweepstakes prizes. Long distance service may be employed as an incentive for submitting to surveys 280 which can then be used to encourage more use of the service 290.

Figure 4:
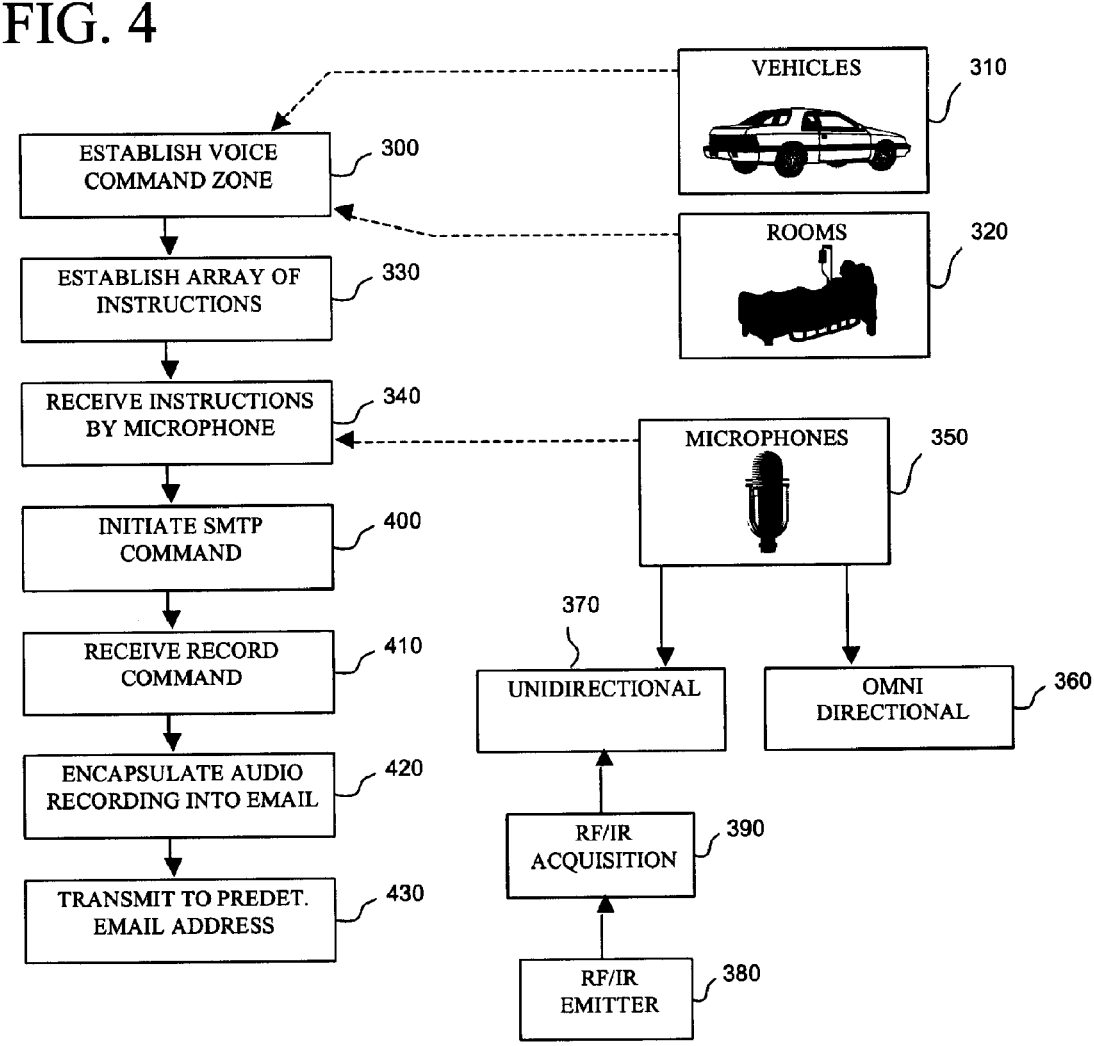
FIG. 4 is a schematic view of an embodiment of the invention for hands-free voice messaging.

In FIG. 4, a voice command zone is established 300. This zone may be the interior of a vehicle 310 a hospital room 320, or any type of human inhabitable dwellings. An array of voice command instructions 330 are established and received by a microphone means 340. The microphones 350 may comprise two general types: omni directional 360 and unidirectional 370. In the case of omni directional microphones 360 sounds from in a 360 degree sweep are recorded. However, in the case of unidirectional microphones 370 a single point is recorded. Accordingly, an RF or IR transmitter may be placed on the person 380 sought to be recorded and an RF or IR acquisition means 390 dynamically tracks the location of the emitter 380 and points to the unidirectional microphone 370 towards the appropriate target. A voice command initiates a corresponding SMTP command 400 to generate a new message or reply to an existing message. Audio recording is initiated responsive to a record command 410 and the audio recording is encapsulated 420 into an email attachment which is then transmitted 430 to a predetermined email address.

Figure 5:
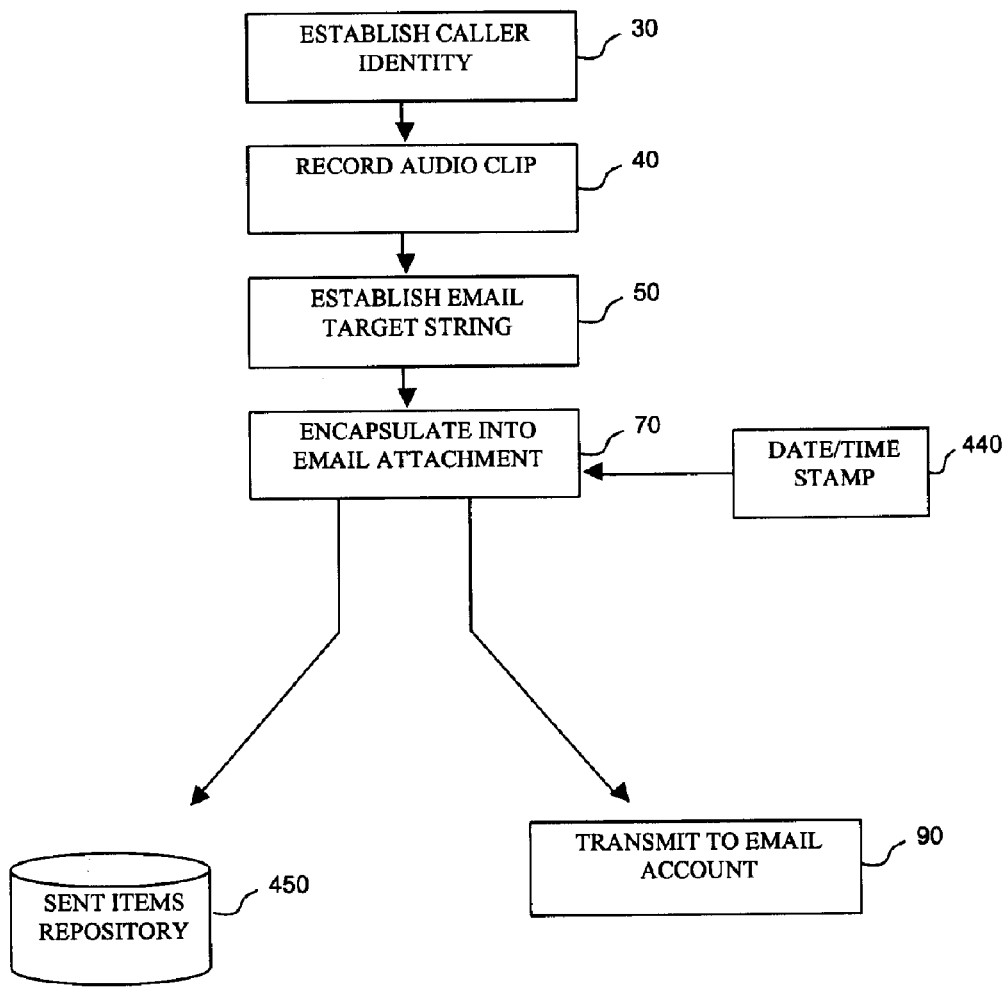
FIG. 5 is a schematic view of an embodiment of the invention for saving outbound voice messages.

In FIG. 5, a caller identity is established 30. An audio clip is recorded 40 and an email target string is established 50. The caller identity, audio clip and target string are encapsulated 70 into an email attachment along with a date/time stamp 440. The email attachment is then transmitted 90 to an email account associated with the email target string. In addition, a copy of the email attachment is stored 450 in a sent items repository.

Figure 6:
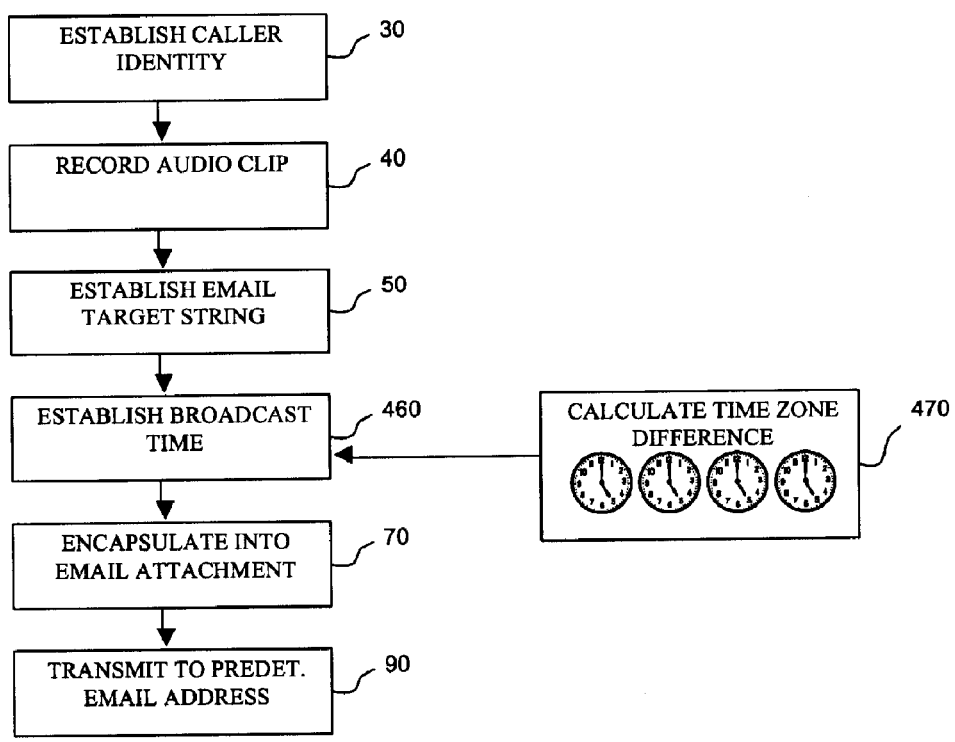
FIG. 6 is a schematic view of an embodiment of the invention featuring scheduled message delivery.

In FIG. 6, a caller identity is established 30. An audio clip is recorded 40 and an email target string is established 50. A broadcast time is established 460. This time may be resolved automatically by calculating the time zone difference 470 between the sender and recipient of the message. The caller identity, audio clip and email target string are all encapsulated into an email attachment 70 and then transmitted to a predetermined email address 90 associated with the email target string at the established broadcast time.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computer implemented method of transmitting electronic voice messages comprising the steps of:

establishing a voice command zone;

establishing an array of voice command instructions relating to the operation of an electronic message system;

receiving the voice command instructions by a microphone input means;

responsive to a voice command establishing a caller identity associated with a first telephone connection;

recording a first audio clip from the first telephone connection;

establishing an email target string;

encapsulating the first audio clip, the caller identity and the email target string into a first email attachment;

transmitting the first email attachment to a first email account associated with the email target string;

broadcasting the first audio clip to a second telephone connection;
prompting the second telephone connection for a reply recording;
responsive to a record signal, recording a second audio clip from the second telephone connection;
encapsulating the second audio clip and the caller identity into a second email attachment;
transmitting the second email attachment to a second email account associated with the caller identity.

2. The method of claim 1 further comprising the step of establishing a play command that broadcasts audio files attached to email messages through a speaker means.

3. The method of claim 1 further comprising the step of establishing a text-to-voice synthesizer, synthesizing text messages into speech, and establishing a play command that broadcasts the synthesized speech through a speaker means.

4. The method of claim 1 wherein the voice command zone is established in an automobile passenger compartment.

5. The method of claim 1 wherein the voice command zone is established in a human-inhabitable dwelling.

6. The method of claim 1 wherein the microphone input means is omni-directional.

* * * * *